(12) United States Patent
Horsley

(10) Patent No.: US 9,079,794 B2
(45) Date of Patent: Jul. 14, 2015

(54) SODA LIME SILICA GLASS COMPOSITION

(75) Inventor: Martin James Horsley, Helsby (GB)

(73) Assignee: PILKINGTON GROUP LIMITED, St. Helens, Merseyside (GB)

( * ) Notice: Subject to any disclaimer, the term of this patent is extended or adjusted under 35 U.S.C. 154(b) by 196 days.

(21) Appl. No.: 13/516,412

(22) PCT Filed: Dec. 17, 2010

(86) PCT No.: PCT/GB2010/052143
§ 371 (c)(1),
(2), (4) Date: Jun. 15, 2012

(87) PCT Pub. No.: WO2011/073684
PCT Pub. Date: Jun. 23, 2011

(65) Prior Publication Data
US 2012/0264583 A1    Oct. 18, 2012

(30) Foreign Application Priority Data

Dec. 17, 2009    (GB) .................................. 0922064.1

(51) Int. Cl.
*C03C 3/087* (2006.01)
*C03C 4/02* (2006.01)
*C03C 4/08* (2006.01)

(52) U.S. Cl.
CPC . *C03C 3/087* (2013.01); *C03C 4/02* (2013.01); *C03C 4/08* (2013.01)

(58) Field of Classification Search
USPC ...................................... 501/70, 71
See application file for complete search history.

(56) References Cited

U.S. PATENT DOCUMENTS

| | | | |
|---|---|---|---|
| 2,524,719 A | 10/1950 | Tillyer | |
| 2,938,808 A | 5/1960 | Duncan et al. | |
| RE25,312 E | 1/1963 | Duncan et al. | |
| 3,220,861 A | 11/1965 | Parry et al. | |
| 3,652,303 A | 3/1972 | Janakirama Rao | |
| 4,104,076 A | 8/1978 | Pons | |
| 4,339,541 A | 7/1982 | Dela Ruye | |
| 4,792,536 A | 12/1988 | Pecoraro et al. | |
| 4,873,206 A | 10/1989 | Jones | |
| 5,308,805 A | 5/1994 | Baker et al. | |
| 5,346,867 A | 9/1994 | Jones et al. | |
| 5,352,640 A | 10/1994 | Combes et al. | |
| 5,362,689 A | 11/1994 | Morimoto et al. | |
| 5,380,685 A | 1/1995 | Morimoto et al. | |
| 5,393,593 A | 2/1995 | Gulotta et al. | |
| 5,411,922 A | 5/1995 | Jones | |
| 5,478,783 A | 12/1995 | Higby et al. | |
| 5,521,128 A | 5/1996 | Jones et al. | |
| 5,523,263 A | 6/1996 | Penrod | |
| 5,545,596 A | 8/1996 | Alvarez Casariego et al. | |
| 5,650,365 A | 7/1997 | Higby et al. | |
| 5,726,109 A | 3/1998 | Ito et al. | |
| 5,728,471 A | 3/1998 | Dupont et al. | |
| 5,807,417 A | 9/1998 | Boulos et al. | |
| 5,827,344 A | 10/1998 | Fyles et al. | |
| 5,837,629 A | 11/1998 | Combes et al. | |
| 5,851,940 A | 12/1998 | Boulos et al. | |
| 5,877,102 A | 3/1999 | DuPont et al. | |
| 5,877,103 A | 3/1999 | Dupont et al. | |
| 5,888,264 A | 3/1999 | Dickinson et al. | |
| 5,905,047 A | 5/1999 | Sasage et al. | |
| 5,932,502 A | 8/1999 | Longobardo et al. | |
| 5,952,255 A | 9/1999 | Seto et al. | |
| 5,962,356 A | 10/1999 | Boulos et al. | |
| 5,985,780 A | 11/1999 | Alvarez Casariego et al. | |
| 5,994,249 A | 11/1999 | Graber et al. | |
| 5,998,316 A | 12/1999 | Seto et al. | |
| 6,071,840 A | 6/2000 | Sasage et al. | |
| 6,080,695 A | 6/2000 | Scheffler-Hudlet et al. | |
| 6,133,179 A | 10/2000 | Berthereau | |
| 6,255,238 B1* | 7/2001 | Brocheton | 501/56 |
| 6,274,523 B1 | 8/2001 | Krumwiede et al. | |
| 6,287,998 B1 | 9/2001 | Seto et al. | |
| 6,333,287 B1* | 12/2001 | Seto | 501/70 |
| 6,335,299 B1 | 1/2002 | Foguenne et al. | |

(Continued)

FOREIGN PATENT DOCUMENTS

| CN | 1109684 A | 10/1995 |
|---|---|---|
| CN | 1636908 A | 7/2005 |

(Continued)

OTHER PUBLICATIONS

Machine Translation of JP 2003-342038 A, Dec. 3, 2003.*

(Continued)

*Primary Examiner* — Anthony J Green
*Assistant Examiner* — Elizabeth A Bolden
(74) *Attorney, Agent, or Firm* — Buchanan Ingersoll & Rooney PC

(57) ABSTRACT

A soda lime silica glass having a colorant portion falling within one of the following combinations of ranges:

| Oxide | Composition | |
|---|---|---|
| $Fe_2O_3$ | 2.1-4.0 weight % | 2.1-4.0 weight % |
| $Co_3O_4$ | 0-1000 ppm | 200-800 ppm |
| NiO | 10-1000 ppm | 50-800 ppm |
| Se | 0-100 ppm | 10-70 ppm |
| $Fe_2O_3$ | 2.3-3.8 weight % | 2.1-4.0 weight % |
| $Co_3O_4$ | 0-1000 ppm | 0-1000 ppm |
| NiO | 10-1000 ppm | 10-1000 ppm |
| Se | 0-100 ppm | 50-100 ppm. |

The glass has low solar heat transmittance and low visible light transmittance. It may be used as a solar control glass or a privacy glass, and is particularly suitable for rooflights, i.e. sunroofs and roof windows, for vehicles. The glass may be manufactured by the float glass process.

13 Claims, No Drawings

(56) References Cited

U.S. PATENT DOCUMENTS

| | | | |
|---|---|---|---|
| 6,395,660 B1* | 5/2002 | Seto et al. | 501/71 |
| 6,408,650 B1 | 6/2002 | Boulos et al. | |
| 6,413,893 B1* | 7/2002 | Shelestak et al. | 501/71 |
| 6,436,860 B2 | 8/2002 | Seto et al. | |
| 6,455,452 B1 | 9/2002 | Krumwiede | |
| RE37,998 E | 2/2003 | Combes et al. | |
| 6,524,713 B2 | 2/2003 | Seto et al. | |
| 6,672,108 B2* | 1/2004 | Landa et al. | 65/134.3 |
| 6,753,280 B2* | 6/2004 | Seto et al. | 501/70 |
| 6,780,803 B2* | 8/2004 | Seto et al. | 501/71 |
| 6,998,362 B2 | 2/2006 | Higby et al. | |
| 8,263,228 B2 | 9/2012 | Torr | |
| 2001/0011057 A1 | 8/2001 | Seto et al. | |
| 2001/0025004 A1 | 9/2001 | Seto et al. | |
| 2001/0056030 A1 | 12/2001 | Seto et al. | |
| 2002/0155939 A1 | 10/2002 | Seto et al. | |
| 2002/0164487 A1 | 11/2002 | Seto et al. | |
| 2002/0198094 A1 | 12/2002 | Arbab et al. | |
| 2003/0083188 A1 | 5/2003 | Seto et al. | |
| 2004/0038799 A1 | 2/2004 | Landa et al. | |
| 2004/0071982 A1 | 4/2004 | Seto et al. | |
| 2004/0157721 A1 | 8/2004 | Foguenne et al. | |
| 2004/0219368 A1 | 11/2004 | Coster et al. | |
| 2006/0134438 A1 | 6/2006 | Coster et al. | |
| 2007/0191208 A1 | 8/2007 | Teyssedre et al. | |
| 2008/0149902 A1 | 6/2008 | Teyssedre | |
| 2009/0033123 A1 | 2/2009 | Torr et al. | |
| 2012/0058879 A1 | 3/2012 | Kim et al. | |

FOREIGN PATENT DOCUMENTS

| | | |
|---|---|---|
| CN | 101164941 A | 4/2008 |
| CN | 102730969 A | 10/2012 |
| EP | 0452207 A1 | 10/1991 |
| EP | 0482535 A1 | 10/1991 |
| EP | 0536049 A1 | 4/1993 |
| EP | 0653388 A1 | 5/1995 |
| EP | 0705800 A1 | 4/1996 |
| EP | 0787692 A1 | 8/1997 |
| EP | 0816296 A | 1/1998 |
| EP | 0825156 A1 | 2/1998 |
| EP | 1081107 A2 | 3/2001 |
| EP | 1200256 B1 | 5/2006 |
| GB | 704374 | 2/1954 |
| GB | 2274841 A | 8/1994 |
| GB | 2315265 A | 1/1998 |
| GB | 2315487 A | 2/1998 |
| GB | 2337516 A | 11/1999 |
| GB | 2403731 A | 1/2005 |
| JP | 57-106537 A | 7/1982 |
| JP | 8245238 A | 9/1996 |
| JP | 9030832 A | 2/1997 |
| JP | 2000219534 A | 8/2000 |
| JP | 2000264672 A | 9/2000 |
| JP | 2000335937 A | 12/2000 |
| JP | 2001019471 A | 1/2001 |
| JP | 2001105849 A | 4/2001 |
| JP | 2002255586 A | 9/2002 |
| JP | 2003-342038 A | 12/2003 |
| WO | 9425408 A1 | 5/1994 |
| WO | 9834883 A1 | 8/1998 |
| WO | 2005007592 A2 | 1/2005 |
| WO | 2007093823 A1 | 8/2007 |
| WO | 2010098576 A2 | 9/2010 |

OTHER PUBLICATIONS

*International Search Report (PCT/ISA/210) issued on May 2, 2011, by the European Patent Office as the International Searching Authority for International Application No. PCT/GB2010/052143.
Search Report dated May 12, 2010, issued by the Intellectual Property Office of GB in corresponding Great Britain Patent Application No. GB0922064.1 (1 page).
First Office Action issued by the Chinese Patent Office in the Chinese counterpart Patent Application No. 201080057518.9 dated Mar. 28, 2014 and English translation of the First Office Action and the Chinese Search Report. (27 pages).

* cited by examiner

SODA LIME SILICA GLASS COMPOSITION

The present invention relates to a glass composition for a soda lime silica glass, which is suitable for forming by the float process. More particularly, the invention relates to a composition for a tinted glass, formulated to reduce the transmission of solar heat through the glass. The glass is suitable for the manufacture of windows for vehicles or buildings. In particular, the glass may be used for vehicle rooflights including sunroofs.

Tinted glasses which are formulated to reduce the transmission of solar heat through the glass are commonly known as solar control glasses. Such glasses are commonly green, blue, bronze or grey in colour. A known bronze glass is disclosed in Japanese patent application JP 55-185165 published as JP 57-106537. The bronze glass disclosed by this publication contains $Fe_2O_3$, CoO, NiO and Se as colouring components, and is suitable for automotive windows. The visible light transmittance may be approximately 70%.

A desire exists for darker glasses, for example, so-called "privacy" glasses, which are used for glazing the rear portions of vehicles, especially multi-purpose vehicles, known in USA as "minivans". Such glasses are typically used for the rear window or backlight and rear side glazing of such vehicles. Examples of such a glass are described in U.S. Pat. No. 5,308,805, which discloses a neutral, generally green-grey low transmittance glass with reduced solar energy transmittance. This glass may have a total iron content of 1.3-2%, expressed as $Fe_2O_3$, and contain 0.01-0.05% NiO, 0.02-0.04% CoO, and 0.0002-0.003% Se. It may have a visible light transmittance of no more than 25% at 4 mm thickness (CIE Illuminant A), and a solar energy transmittance of no more than the visible light transmittance.

Another example of a low transmittance glass is disclosed in EP 825 156 A1. This document mentions colourant ranges including 1.2 to 2.2% total iron oxide expressed as $Fe_2O_3$, 0.001 to 0.03% CoO, 0 to 0.0008% Se, and 0 to 0.2% NiO.

A further example of a low transmittance glass is disclosed in EP 1 081 107 A2. This document mentions colourant ranges including 1.2 to 2.2% total iron oxide expressed as $Fe_2O_3$, greater than 0.03% CoO, less than 0.0001% Se, and 0 to 0.2% NiO.

In more recent years, pressure has developed to reduce carbon dioxide emissions for environmental reasons connected with the influence of atmospheric carbon dioxide on the climate. This has resulted in attention being paid to the carbon dioxide emissions from buildings and vehicles. Various approaches have been followed, one of which seeks to reduce the amount of energy used for air-conditioning of buildings and vehicles in hot sunny regions of the world. The type of glass used to glaze buildings and vehicles in such regions can have a significant effect on solar gain, i.e. the rise in temperature in a building or vehicle resulting from solar radiation. Reducing solar gain in turn reduces both the power rating of the air-conditioning plant required, and the length of time for which it needs to be operated. This yields a reduction in carbon dioxide emissions associated with the air-conditioning plant, which in vehicles manifests itself in reduced fuel consumption. However, the ability of existing solar control glasses to reduce solar gain is limited. Although proposals exist for glasses which would in theory have improved solar control properties, in many cases, these glasses have not been made, and they are certainly not commercially available.

A need now exists for a solar control glass having a solar control performance significantly better than that offered by available glasses. It is also desirable that this improved glass is suitable for manufacture by the float process to allow supply of an adequate volume of glass at acceptable cost. A practical glass is needed, which can be manufactured on a commercial scale, to meet the demand for glass for vehicles and buildings.

According to the present invention, there is provided a soda lime silica glass having a colourant portion comprising:

| | |
|---|---|
| $Fe_2O_3$ | 2.1-4.0% weight percent (i.e. total iron expressed as $Fe_2O_3$) |
| $Co_3O_4$ | 0-1000 ppm |
| NiO | 10-1000 ppm |
| Se | 0-100 ppm. |

As will be explained in more detail below, glasses with compositions in these ranges make it possible to attain new levels of solar performance, for instance, the total solar transmittance (Tts, as defined in ISO 13837, measured using Convention A, wind velocity 4 m/s)

A particularly preferred glass has a colourant portion comprising:

| | |
|---|---|
| $Fe_2O_3$ | 2.1-4.0% weight percent |
| $Co_3O_4$ | 200-800 ppm |
| NiO | 50-800 ppm |
| Se | 10-70 ppm. |

Another particularly preferred glass has a colourant portion comprising:

| | |
|---|---|
| $Fe_2O_3$ | 2.3-3.8% weight percent |
| $Co_3O_4$ | 0-1000 ppm |
| NiO | 10-1000 ppm |
| Se | 0-100 ppm. |

Alternatively, the contents of Co3O4, NiO and Se may be restricted to the narrower ranges given above and below, while retaining the range of 2.3-3.8 weight percent for total iron expressed as $Fe_2O_3$. Another possibility included in the invention is a total iron content of 2.4-3.6% in combination with Co3O4, NiO and Se contents as given above and below.

A further particularly preferred family of glasses has a colourant portion comprising:

| | |
|---|---|
| $Fe_2O_3$ | 2.1-4.0% weight percent |
| $Co_3O_4$ | 0-1000 ppm |
| NiO | 10-1000 ppm |

Se 50-100 ppm, preferably 60-100 ppm. The comments above about alternative ranges for Co3O4 and NiO apply to this family of glasses as well, as do the narrower ranges for total iron of 2.3-3.8% and 2.4-3.6%.

More preferably, the invention provides a family of glasses having a colourant portion comprising:

| | |
|---|---|
| $Fe_2O_3$ | 2.1-3.8% weight percent |
| $Co_3O_4$ | 230-700 ppm |
| NiO | 60-700 ppm |
| Se | 12-65 ppm. |

More preferably, the glass has a colourant portion comprising:

| | | |
|---|---|---|
| $Fe_2O_3$ | 2.2-3.4% | weight percent |
| $Co_3O_4$ | 260-600 | ppm |
| NiO | 70-600 | ppm |
| Se | 15-60 | ppm. |

More preferably, the glass has a colourant portion comprising:

| | | |
|---|---|---|
| $Fe_2O_3$ | 2.2-3.0% | weight percent |
| $Co_3O_4$ | 300-500 | ppm |
| NiO | 100-500 | ppm |
| Se | 20-50 | ppm. |

Yet more preferably, the glass has a colourant portion comprising:

| | | |
|---|---|---|
| $Fe_2O_3$ | 2.2-2.6% | weight percent |
| $Co_3O_4$ | 300-400 | ppm |
| NiO | 200-300 | ppm |
| Se | 25-40 | ppm. |

Optionally, the glass has a colourant portion comprising:

| | | |
|---|---|---|
| $Fe_2O_3$ | 2.2-2.6% | weight percent |
| $Co_3O_4$ | 400-500 | ppm |
| NiO | 100-500 | ppm |
| Se | 40-50 | ppm. |

Alternatively, the glass may be as above but with $Co_3O_4$ between 550 and 1000 ppm. Another option is for the glass to contain between 450 and 1000 ppm NiO.

All the glass compositions contain nickel.

Preferably, the glass has a colour defined by the CIELAB coordinate system (I11 D65) as follows: $a^*=-3.2\pm10$; $b^*=6.5\pm10$; $L^*=50\pm10$; or $a^*=-3.2\pm5$; $b^*=6.5\pm10$; $L^*=50\pm10$; or $a^*=-3.2\pm5$; $b^*=6.5\pm5$; $L^*=50\pm10$; or $a^*=-3.2\pm3$; $b^*=6.5\pm3$; $L^*=50\pm10$; or $a^*=-1.8\pm5$; $b^*=4.4\pm5$; $L^*=50\pm10$; or $a^*=-1.8\pm3$; $b^*=4.4\pm3$; $L^*=50\pm10$. The glass is preferably of a neutral tint. Neutral tints are best suited for use alongside coloured structures, whether these be vehicle bodywork or architectural structures. In terms of dominant wavelength, the glass preferably has a dominant wavelength (I11 D65) in the region of 570 nm, and a colour purity of less than 20%, more preferably less than 10%.

As is well known, iron is present in soda lime silica glass in both ferrous and ferric states. The proportion of iron in each state is influenced by factors such as the presence of oxidising or reducing agents in the batch, and the oxygen to fuel ratio at the burners, i.e. whether the flames produce an oxidising or reducing atmosphere. (Batch is the term given to the mixture of raw materials which is filled into the furnace and melted to yield glass.) It is conventional practice to express the total iron content of a glass as if all the iron were present as $Fe_2O_3$, even though this is not the case. The "ferrous content" is defined as the weight percent ferrous oxide in the glass divided by the weight percent of total iron expressed as $Fe_2O_3$. Preferably, the glass has a ferrous content of between 10 and 40% of the total iron, more preferably between 15 and 35% of the total iron, expressed as $Fe_2O_3$.

Preferably, the glass has a visible light transmission of 1 to 20% and a direct solar heat transmission of 1 to 20%, more preferably it has a visible light transmission of 2 to 10% and a direct solar heat transmission of 2 to 10%.

Preferably, the glass has a Total Transmitted Solar value of 30% or less (ISO 13837:2008, Convention A, wind velocity 4 m/s.)

According to a further aspect of the invention, a sheet, pane or glazing made of tinted glass having a composition as described herein may be coated with a low emissivity coating. Preferably the glazing is for a vehicle, and the low emissivity coating is on the interior surface of the glazing, i.e. on the surface which faces towards the interior of the vehicle when the glazing is installed in the vehicle.

In this aspect of the invention, the low emissivity coating is in accordance with WO 200/007592 A2, i.e. it is a known low emissivity coating, which may for example include a metal or metal oxide layer. In the latter case, the metal oxide may be doped, e.g. with fluorine. A preferred metal layer is contains at least one silver layer and is deposited by a magnetic sputtering technique. A preferred metal oxide layer is a transparent conductive oxide, e.g. an oxide of tin, zinc, indium, tungsten or molybdenum. Alternative dopants include chlorine, antinomy, tin, aluminium, tantalum, niobium, indium or gallium. In either case, the functional layer is provided as part of a multilayer coating stack as is known in the art.

A glazing according to this aspect of the invention has an especially enhanced solar control performance, because the low emissivity coating reduces the amount of heat which is re-radiated into the interior of the vehicle. In more detail, the dark tinted glass absorbs incident solar radiation, which thereby increases its temperature, causing it to re-radiate the heat absorbed. The low emissivity coating increases the proportion of this heat which is radiated to the exterior, and reduces the amount of heat which is radiated into the interior of the vehicle.

The composition of soda lime silica glass varies according to manufacturer and manufacturing location. Different manufacturers have differing preferences in terms of the glass properties which are dependent on composition. Also, the raw materials available in the various different glass-making locations around the world differ in terms of their chemical composition.

The composition of the base glass (i.e. the glass composition with colourants omitted) is within the ranges given in the middle column of Table 1, headed Broad Range. Preferably the composition is within the ranges given in the right-hand column, headed Narrow Range.

TABLE 1

| Base Soda Lime Silica Glass Compositions | | |
|---|---|---|
| | Broad Range (wt %) | Narrow Range (wt %) |
| $SiO_2$ | 64-80 | 68-75 |
| $Al_2O_3$ | 0-5 | 0-3 |
| $Na_2O$ | 9-18 | 11-15 |
| $K_2O$ | 0-5 | 0-3 |
| CaO | 2-15 | 6-11 |
| MgO | 0-10 | 2-6 |
| $SO_3$ | 0.05-0.4 | 0.1-0.4 |

The compositions of most commercially available soda lime silica glasses from around the world fall within the following ranges, and the invention may be used with this range of compositions for the base glass:

| | |
|---|---|
| $SiO_2$ | 70.0-73.0 |
| $Al_2O_3$ | 0-2.0 |
| $Na_2O$ | 12.4-14.2 |
| $K_2O$ | 0-1.2 |
| CaO | 7.3-10.0 |
| MgO | 3.6-5.0 |
| $SO_3$ | 0.17-0.37 |

Preferably, a glass according to the invention is free from the following oxides: $As_2O_3$, BaO, $B_2O_3$, BeO, $GeO_2$, $Li_2O$, $P_2O_5$, PbO, $Sb_2O_3$, SrO, $TiO_2$, $V_2O_5$, ZnO and $ZrO_2$, except possibly for trace levels unintentionally added together with other raw materials. Some of these oxides are harmful to glass furnaces or to the float bath, in particular to the molten tin contained in the bath. Others are regarded as hazardous to human health, so are preferably not included for Health & Safety reasons. Preferably, the desired tint is achieved without the use of the following colourants: $CeO_2$, $Cr_2O_3$, $Er_2O_3$, $MnO_2$, $Nd_2O_3$, i.e. preferably the glass is free of these oxides except for trace levels unintentionally added together with other raw materials. Should any of these oxides be intentionally included, it would be at a minimal level, e.g. less than 0.5 wt %.

The invention will now be further described with reference to the following non-limiting Examples, which are tabulated in Table 2. In this specification, all compositions and proportions of oxides are given in weight percent, unless indicated to the contrary. It is noted in particular that the proportions of the colourants $Co_3O_4$, NiO and Se are given in parts per million (ppm). In the table, the spectral properties are provided for three different standard Illuminants, namely, Illuminants A, C and D65.

TABLE 2

Chemical Analysis and Optical Properties (at 4.0 mm, CIE 1931, 2° Observer)

| Example | 1 | 2 | 3 | 4 | 5 | 6 | 7 |
|---|---|---|---|---|---|---|---|
| Major Oxide Components | | | | | | | |
| SiO2 | 71.4 | 71.1 | 71.1 | 69.6 | 72.1 | 72.4 | 71.9 |
| CaO | 8.44 | 8.19 | 8.21 | 9.39 | 7.54 | 7.3 | 7.51 |
| Al2O3 | 0.15 | 0.12 | 0.12 | 0.19 | 0.13 | 0.11 | 0.11 |
| MgO | 4.19 | 4.23 | 4.28 | 4.45 | 4 | 3.86 | 4.08 |
| Na2O | 13.1 | 13.5 | 13.5 | 13.9 | 13.6 | 13.5 | 13.6 |
| K2O | 0.06 | 0.04 | 0.04 | 0.15 | 0.02 | 0.13 | 0.03 |
| SO3 | 0.20 | 0.21 | 0.22 | 0.17 | 0.12 | 0.17 | 0.26 |
| Colourants | | | | | | | |
| Fe2O3 | 2.37 | 2.51 | 2.50 | 2.11 | 2.4 | 2.42 | 2.46 |
| Fe2+ % | 23.5 | 25.5 | 25.6 | 38.0 | 31.0 | 26.0 | 14.6 |
| Co3O4 (ppm) | 352 | 723 | 436 | 597 | 660 | 645 | 399 |
| NiO (ppm) | 230 | 187 | 778 | 430 | 451 | 15 | 210 |
| Se (ppm) | 32 | 17 | 24 | <2 | <2 | | 39 |
| Perceived Sample Colour | Neutral (green) | Blue | Neutral (green) | Vivid blue | Vivid blue | Blue | Neutral (brown) |
| Optical properties Illuminant A | | | | | | | |
| LT (Y) | 4.5 | 2.1 | 2.8 | 3.9 | 3.3 | 5.0 | 5.3 |
| L* | 25.2 | 16.2 | 19.2 | 23.2 | 21.2 | 26.7 | 27.4 |
| a* | −3.0 | −10.2 | −4.8 | −16.7 | −15.5 | −16.1 | −1.2 |
| b* | 6.5 | −20.3 | 5.3 | −30.3 | −29.7 | −41.1 | 6.6 |
| Dominant wavelength | 573.2 | 488.4 | 564.5 | 488.4 | 488 | 485.7 | 578.3 |
| Purity | 19.9% | 33.5% | 18.0% | 42.4% | 43.2% | 48.3% | 20.5% |
| Illuminant C | | | | | | | |
| LT (Y) | 4.5 | 2.5 | 2.8 | 4.7 | 4.0 | 6.2 | 5.2 |
| L* | 25.1 | 17.8 | 19.3 | 25.9 | 23.8 | 30.0 | 27.3 |
| a* | −3.6 | 0.5 | −5.5 | −0.5 | 0.3 | 5.9 | −2.4 |
| b* | 6.7 | −18.5 | 6.0 | −26.8 | −26.3 | −36.9 | 6.7 |
| Dominant wavelength | 567.7 | 476.5 | 560.1 | 477.1 | 476.7 | 474.9 | 571.2 |
| Purity | 16.0% | 47.7% | 15.7% | 55.5% | 56.5% | 62.5% | 15.8% |
| Illuminant D65 | | | | | | | |
| LT (Y) | 4.4 | 2.5 | 2.8 | 4.7 | 4.0 | 6.2 | 5.2 |
| L* | 25.1 | 17.7 | 19.3 | 25.9 | 23.8 | 29.9 | 27.2 |
| a* | −3.2 | −0.1 | −5.2 | −1.7 | −0.8 | 4.3 | −2.0 |
| b* | 6.5 | −18.5 | 5.8 | −26.8 | −26.4 | −37 | 6.4 |
| Dominant wavelength | 567.5 | 477.2 | 559.6 | 477.9 | 477.5 | 475.6 | 571.1 |
| Purity | 16.1% | 46.9% | 15.6% | 54.6% | 55.7% | 61.6% | 15.8% |
| DSHT (ISO 9050 AM1.5) | 4.1 | 3.1 | 3.0 | 3.9 | 3.6 | 5.6 | 8.2 |
| TSHT (ISO 13837, Convention A, wind velocity 4 m/s) | 29.9 | 29.1 | 29.1 | 29.7 | 29.5 | 30.9 | 32.8 |

| Example | 8 | 9 | 10 | 11 | 12 | 13 | 14 |
|---|---|---|---|---|---|---|---|
| Major Oxide Components | | | | | | | |
| SiO2 | 71.6 | 71.5 | 71.3 | 72.3 | 72.1 | 72.2 | 72.5 |
| CaO | 7.63 | 7.6 | 7.71 | 7.28 | 7.42 | 7.32 | 7.18 |
| Al2O3 | 0.1 | 0.1 | 0.1 | 0.11 | 0.13 | 0.1 | 0.1 |

TABLE 2-continued

Chemical Analysis and Optical Properties (at 4.0 mm, CIE 1931, 2° Observer)

| | | | | | | | |
|---|---|---|---|---|---|---|---|
| MgO | 4.16 | 4.13 | 4.2 | 4.20 | 4.22 | 4.22 | 4.13 |
| Na2O | 13.7 | 13.8 | 13.8 | 13.4 | 13.5 | 13.5 | 13.4 |
| K2O | 0.03 | 0.03 | 0.03 | 0.09 | 0.05 | 0.04 | 0.04 |
| SO3 | 0.23 | 0.26 | 0.24 | 0.11 | 0.11 | 0.14 | 0.13 |
| Colourants | | | | | | | |
| Fe2O3 | 2.47 | 2.51 | 2.51 | 2.41 | 2.39 | 2.42 | 2.42 |
| Fe2+ % | 15.7 | 13.8 | 15.0 | 22.0 | 21.3 | 22.0 | 21.9 |
| Co3O4 (ppm) | 409 | 438 | 421 | 459 | 456 | 412 | 453 |
| NiO (ppm) | 212 | 87 | 86 | 78 | 80 | 148 | 82 |
| Se (ppm) | 33 | 52 | 43 | 38 | 26 | 47 | 52 |
| Perceived Sample Colour | Neutral (green) | Neutral (brown) | Neutral | Neutral | | | |
| Optical properties Illuminant A | | | | | | | |
| LT (Y) | 5.4 | 4.0 | 4.6 | 3.6 | 5.0 | 3.2 | 2.6 |
| L* | 27.8 | 23.7 | 25.7 | 22.2 | 26.7 | 20.7 | 18.5 |
| a* | −3.6 | 0.6 | −0.9 | −3.8 | −8.6 | −0.3 | 0.1 |
| b* | 3.9 | 8.4 | 6.2 | 0.5 | −5.9 | 8.3 | 6.9 |
| Dominant wavelength | 564.5 | 583.0 | 579.0 | 512.8 | 498.0 | 581.0 | 581.9 |
| Purity | 10.7% | 29.0% | 20.2% | 3.7% | 11.7% | 30.4% | 27.2% |
| Illuminant C | | | | | | | |
| LT (Y) | 5.4 | 3.9 | 4.6 | 3.6 | 5.3 | 3.1 | 2.6 |
| L* | 27.9 | 23.3 | 25.5 | 22.4 | 27.5 | 20.4 | 18.2 |
| a* | −4.1 | −0.9 | −1.8 | −2.7 | −5.8 | −1.5 | −0.6 |
| b* | 4.5 | 8.0 | 6.1 | 0.7 | −4.3 | 7.9 | 6.3 |
| Dominant wavelength | 560.6 | 575.5 | 572.2 | 507.4 | 486.9 | 574.1 | 575.7 |
| Purity | 9.3% | 21.8% | 15.2% | 2.2% | 15.2% | 23.1% | 19.9% |
| Illuminant D65 | | | | | | | |
| LT (Y) | 5.4 | 3.9 | 4.5 | 3.6 | 5.3 | 3.1 | 2.5 |
| L* | 27.8 | 23.2 | 25.4 | 22.3 | 27.5 | 20.3 | 18.1 |
| a* | −3.8 | −0.4 | −1.4 | −2.4 | −5.8 | −1.0 | −0.2 |
| b* | 4.3 | 7.8 | 5.9 | 0.5 | −4.4 | 7.7 | 6.1 |
| Dominant wavelength | 560.3 | 575.4 | 572.2 | 505.7 | 487.4 | 574.0 | 575.7 |
| Purity | 9.1% | 21.9% | 15.2% | 2.2% | 15.0% | 23.3% | 20.0% |
| DSHT (ISO 9050 AM1.5) | 7.5 | 7.9 | 7.4 | 4.2 | 5.3 | 3.9 | 3.7 |
| TSHT (ISO 13837, Convention A, wind velocity 4 m/s) | 32.3 | 32.6 | 32.3 | 30.0 | 30.7 | 29.8 | 29.6 |

| Example | 15 | 16 | 17 | 18 | 19 | 20 |
|---|---|---|---|---|---|---|
| Major Oxide Components | | | | | | |
| SiO2 | 72.2 | 72.2 | 72.2 | 72.2 | 72.2 | 72.2 |
| CaO | 7.34 | 7.31 | 7.31 | 7.31 | 7.3 | 7.3 |
| Al2O3 | 0.1 | 0.11 | 0.11 | 0.1 | 0.1 | 0.1 |
| MgO | 4.24 | 4.23 | 4.23 | 4.23 | 4.24 | 4.23 |
| Na2O | 13.4 | 13.5 | 13.5 | 13.5 | 13.5 | 13.5 |
| K2O | 0.04 | 0.04 | 0.04 | 0.04 | 0.04 | 0.04 |
| SO3 | 0.14 | 0.12 | 0.09 | 0.11 | 0.10 | 0.11 |
| Colourants | | | | | | |
| Fe2O3 | 2.44 | 2.43 | 2.45 | 2.45 | 2.44 | 2.45 |
| Fe2+ % | 20.0 | 19.9 | 23.0 | 21.2 | 21.8 | 21.0 |
| Co3O4 (ppm) | 458 | 412 | 434 | 433 | 457 | 458 |
| NiO (ppm) | 76 | 155 | 107 | 103 | 78 | 79 |
| Se (ppm) | 62 | 21 | 19 | 25 | 20 | 28 |
| Perceived Sample Colour | | | | | | |
| Optical properties Illuminant A | | | | | | |
| LT (Y) | 2.7 | 6.4 | 5.7 | 5.3 | 5.6 | 4.6 |
| L* | 18.8 | 30.4 | 28.6 | 27.5 | 28.3 | 25.5 |
| a* | 1.7 | −8.8 | −10.2 | −7.8 | −10.1 | −6.8 |
| b* | 9.4 | −5.2 | −8.7 | −4.6 | −9.7 | −4.1 |
| Dominant wavelength | 584.7 | 499.0 | 496.3 | 499.0 | 495.3 | 498.9 |
| Purity | 37.3% | 10.5% | 14.5% | 9.9% | 15.4% | 9.1% |
| Illuminant C | | | | | | |
| LT (Y) | 2.6 | 6.7 | 6.1 | 5.6 | 6.0 | 4.8 |
| L* | 18.3 | 31.2 | 29.7 | 28.3 | 29.4 | 26.1 |
| a* | 0.3 | −6.2 | −6.0 | −5.1 | −5.4 | −4.3 |
| b* | 8.6 | −3.6 | −6.9 | −3.4 | −8.0 | −3.2 |

TABLE 2-continued

Chemical Analysis and Optical Properties (at 4.0 mm, CIE 1931, 2° Observer)

| Dominant wavelength | 577.9 | 488.1 | 484.9 | 487.5 | 483.7 | 487 |
|---|---|---|---|---|---|---|
| Purity | 27.4% | 13.2% | 20.0% | 12.5% | 21.6% | 11.6% |
| Illuminant D65 | | | | | | |
| LT (Y) | 2.6 | 6.7 | 6.1 | 5.5 | 6.0 | 4.8 |
| L* | 18.2 | 31.2 | 29.6 | 28.2 | 29.3 | 26.1 |
| a* | 0.8 | −6.3 | −6.2 | −5.1 | −5.7 | −4.2 |
| b* | 8.4 | −3.8 | −7.0 | −3.5 | −8.1 | −3.3 |
| Dominant wavelength | 577.8 | 488.6 | 485.5 | 488.0 | 484.4 | 487.4 |
| Purity | 27.6% | 13.2% | 19.6% | 12.4% | 21.3% | 11.5% |
| DSHT (ISO 9050 AM1.5) | 4.4 | 6.4 | 5.1 | 5.4 | 5.4 | 5.0 |
| TSHT (ISO 13837, Convention A, wind velocity 4 m/s) | 30.1 | 31.5 | 30.6 | 30.8 | 30.8 | 30.5 |

It is known that glasses containing high levels of nickel, i.e. above about 200 ppm, may develop a haze or bloom on the upper surface in the float bath. This is due to nickel oxide in the glass being reduced to metallic nickel by the bath atmosphere, which is reducing, in order to minimise oxidation of the tin. The occurrence of nickel haze may be avoided by reducing the amount of hydrogen in the bath atmosphere. It is in fact possible to operate the float bath for short periods without any hydrogen in the bath atmosphere, if all possible measures are taken to avoid air ingress.

When changing from production of clear glass to tinted glass, or from one tint to another, it is recommended to match the density of the second glass to that of the first in accordance with EP 787 692, which corresponds to U.S. Pat. No. 5,827,344.

For the avoidance of doubt, the tint provided by the glass compositions described in this specification is permanent and unvarying. Glasses, glazings and windows manufactured using these glass compositions are not to be confused with thermochromic, electrochromic or photochromic glazings, or the like, in which the tint may be varied, adjusted or controlled by ambient conditions or external signals or voltages.

The invention claimed is:

1. A soda lime silica glass having a base glass composition comprising:

| $SiO_2$ | 68-75 weight percent |
|---|---|
| $Al_2O_3$ | 0-3 weight percent |
| $Na_2O$ | 11-15 weight percent |
| $K_2O$ | 0-3 weight percent |
| CaO | 6-11 weight percent |
| MgO | 2-6 weight percent |
| $SO_3$ | 0.1-0.4 weight percent | and having a colourant portion comprising:

| $Fe_2O_3$ | 2.3-3.8% weight percent |
|---|---|
| $Co_3O_4$ | 300-500 ppm |
| NiO | 10-1000 ppm |
| Se | 20-50 ppm | wherein the tint is achieved without the use of $Cr_2O_3$, and the glass is free from $B_2O_3$, $Cr_2O_3$ and $V_2O_5$ except for trace levels, and
wherein the glass itself has a visible light transmission of 2 to 10% measured at a thickness of 4 mm and a direct solar heat transmission of 2 to 10% measured at a thickness of 4 mm.

2. A soda lime silica glass as claimed in claim 1 having a colourant portion comprising:

| $Fe_2O_3$ | 2.3-3.8% weight percent |
|---|---|
| $Co_3O_4$ | 300-400 ppm |
| NiO | 10-1000 ppm |
| Se | 20-50 ppm. |

3. A soda lime silica glass as claimed in claim 2 having a colourant portion comprising:

| $Fe_2O_3$ | 2.3-3.8% weight percent |
|---|---|
| $Co_3O_4$ | 300-400 ppm |
| NiO | 10-1000 ppm |
| Se | 25-40 ppm. |

4. A soda lime silica glass as claimed in claim 3 having a colourant portion comprising:

| $Fe_2O_3$ | 2.4-3.6% weight percent |
|---|---|
| $Co_3O_4$ | 300-400 ppm |
| NiO | 10-1000 ppm |
| Se | 25-40 ppm. |

5. A soda lime silica glass as claimed in claim 1 having a colourant portion comprising:

| $Fe_2O_3$ | 2.3-3.8% weight percent |
|---|---|
| $Co_3O_4$ | 400-500 ppm |
| NiO | 10-1000 ppm |
| Se | 40-50 ppm. |

6. A soda lime silica glass as claimed in claim 1, having a colour defined by the CIELAB coordinate system (I11 D65) as follows: a*=−3.2±10; b*=6.5±10; L*=50±10.

7. A soda lime silica glass as claimed in claim 6, having a colour defined by the CIELAB coordinate system (I11 D65) as follows: a*=−3.2±5; b*=6.5±5; L*=50±10.

8. A soda lime silica glass as claimed in claim 7, having a colour defined by the CIELAB coordinate system (I11 D65) as follows: a*=−3.2±3; b*=6.5±3; L*=50±10.

9. A soda lime silica glass as claimed in claim 1, having a ferrous content of between 10 and 40% of the total iron, expressed as $Fe_2O_3$.

10. A soda lime silica glass as claimed in claim 9, having a ferrous content of between 15 and 35% of the total iron, expressed as $Fe_2O_3$.

11. A soda lime silica glass as claimed in claim 1, having a Total Transmitted Solar value of 30% or less.

12. A soda lime silica glass having a base glass composition comprising:

| | | |
|---|---:|---|
| $SiO_2$ | 68-75 | weight percent |
| $Al_2O_3$ | 0-3 | weight percent |
| $Na_2O$ | 11-15 | weight percent |
| $K_2O$ | 0-3 | weight percent |
| CaO | 6-11 | weight percent |
| MgO | 2-6 | weight percent |
| $SO_3$ | 0.1-0.4 | weight percent | and having a colorant portion comprising:

| | | |
|---|---:|---|
| $Fe_2O_3$ | 2.3-3.8% | weight percent |
| $Co_3O_4$ | 300-500 | ppm |
| Se | 20-50 | ppm |
| NiO | | | wherein the tint is achieved without the use of $Cr_2O_3$, and the glass is free from $Cr_2O_3$ and $V_2O_5$ except for trace levels, wherein the glass itself has a visible light transmission of 2 to 10% measured at a thickness of 4 mm and a direct solar heat transmission of 2 to 10% measured at a thickness of 4 mm, and wherein the glass has a ferrous content of between 10 and 26% of the total iron, expressed as $Fe_2O_3$.

13. A soda lime silica glass having a base glass composition comprising:

| | | |
|---|---:|---|
| $SiO_2$ | 68-75 | weight percent |
| $Al_2O_3$ | 0-3 | weight percent |
| $Na_2O$ | 11-15 | weight percent |
| $K_2O$ | 0-3 | weight percent |
| CaO | 6-11 | weight percent |
| MgO | 2-6 | weight percent |
| $SO_3$ | 0.1-0.4 | weight percent | and having a colourant portion comprising:

| | | |
|---|---:|---|
| $Fe_2O_3$ | 2.3-3.8% | weight percent |
| $Co_3O_4$ | 300-500 | ppm |
| NiO | 10-1000 | ppm |
| Se | 20-50 | ppm | wherein the tint is achieved without the use of $Cr_2O_3$, and the glass is free from $B_2O_3$, $Cr_2O_3$ and $V_2O_5$ except for trace levels, and wherein the glass itself has a Total Transmitted Solar value of 30% or less measured at a thickness of 4 mm.

\* \* \* \* \*